United States Patent
Tokuda et al.

(10) Patent No.: US 7,245,508 B2
(45) Date of Patent: Jul. 17, 2007

(54) POWER CONVERSION APPARATUS

(75) Inventors: Hirokazu Tokuda, Tokyo (JP);
Nobuyuki Kobayashi, Tokyo (JP);
Yasuhiro Okuma, Hyogo (JP);
Hiroyuki Matsuo, Hyogo (JP); Osamu Hashimoto, Hyogo (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 0 days.

(21) Appl. No.: 11/139,982

(22) Filed: May 31, 2005

(65) Prior Publication Data

US 2006/0007712 A1 Jan. 12, 2006

(30) Foreign Application Priority Data

Jul. 8, 2004 (JP) ............................. 2004-201410

(51) Int. Cl.
*H02M 3/335* (2006.01)
*H02H 7/122* (2006.01)

(52) U.S. Cl. ....................... 363/17; 363/98; 363/56.02; 363/132

(58) Field of Classification Search ................. 363/17, 363/56.02, 98, 132
See application file for complete search history.

(56) References Cited

U.S. PATENT DOCUMENTS 6,314,007 B2 * 11/2001 Johnson et al. ............... 363/37
6,603,675 B1 * 8/2003 Norrga ........................ 363/132
6,621,723 B1 * 9/2003 Karasawa et al. ........... 363/132
6,643,157 B2 * 11/2003 Furukawa et al. ........... 363/132

FOREIGN PATENT DOCUMENTS

| JP | 02-231965 | 9/1990 |
|---|---|---|
| JP | 08-126352 | 5/1996 |
| JP | 2000-262071 | 9/2000 |

* cited by examiner

*Primary Examiner*—Bao Q. Vu
(74) *Attorney, Agent, or Firm*—Rabin & Berdo PC

(57) ABSTRACT

A power conversion apparatus includes serially connected arms U and X, serially connected arms V and Y, serially connected arms W and Z, and a capacitor, the pairs of serially connected arms and the capacitor all connected in parallel to one another. The input-side arms U and X and the output-side arms W and Z are subjected to PWM control so that the arms W and Z are controlled to have a voltage that is lower than that of the arms U and X, thereby providing a step down operation. A step up operation also can be provided by an opposite relation in which the arms W and Z are controlled to have a voltage that is higher than that of the arms U and X, thereby to expand the range within which the output voltage is controlled with the effect of reducing distortion.

2 Claims, 6 Drawing Sheets

Vin    Vout

POWER CONVERSION APPARATUS

BACKGROUND OF THE INVENTION

1. Field of the Invention

The invention relates to a switching-type power conversion apparatus, which, for example, may be used for a constant voltage/constant frequency power source apparatus or a power compensation apparatus.

2. Prior Art

With regard to this type of power source, various efforts have been made to improve the apparatus efficiency for the purpose of reducing wasteful consumption of power or better handling generated heat. One example of a effort frequently undertaken to reduce the switching loss of a power semiconductor switching element (e.g., an insulating-gate type bipolar transistor (IGBT)) generally used for this type of power source (the loss occurring at the time at which this type of switching element is turned on or off due to the fact that this type of switching element is not an ideal switch), is to reduce as much as possible the number of switching times. This type of constant voltage power source has also been required to output a constant target voltage, thus requiring a power compensation apparatus to control the output voltage. Thus, this type of power source must be able to change an input voltage to output the target voltage at an output terminal.

FIGS. 3A and 3B illustrate an example of this type of power source, which is disclosed in Japanese Patent Publication No. 2521345 (pp. 3-4, FIG. 1). In the power source shown in FIG. 3A, the serially connected arms V and Y are driven with a pulse synchronized with the inverse of the phase of the input voltage Vin to reduce the frequency with which voltage is switched when compared with a case of a pulse-width modulation (PWM) converter in which switching is performed with a frequency sufficiently higher than a power source frequency, thereby providing a conversion with a high efficiency.

In this case, serially connected arms W and Z are operated as shown in FIG. 3A as a PWM converter switched with a frequency sufficiently higher than a power source frequency that the full bridge converter composed of serially connected arms V and Y and serially connected arms W and Z is operated as an inverter, thereby providing an output having a sinusoidal waveform. Although FIG. 3B schematically shows the serially connected arms W and Z having pulses with a constant interval, in actuality, these pulse widths are increased or decreased depending on a signal waveform subjected to PWM modulation. Then, a DC voltage that is a source of an output voltage is rectified by a full bridge converter by the combination of the input-side arms U and X and the arms V and Y, and thus the DC voltage is equal to or lower than the peak of input voltage.

As a result, this type of converter is limited to providing a step down operation for making the output voltage lower than the input voltage or an operation for providing an input voltage equal to the output voltage. Specifically, there is a limitation that this converter cannot provide a step up operation for making the output voltage higher than the input voltage. The reason that the input side operates as a diode bridge is that the pulse pattern created by the arms V and Y shown in FIG. 3B fires the diode with the timing at which the elements V and Y receive a firing signal. Consequently, the circuit as shown in FIG. 4A can be operated in a similar manner. The output waveforms Vout are also similarly provided in FIG. 3B and FIG. 4B.

FIGS. 5A-5C illustrate another example of this type of power source, which is shown in Japanese Patent Publication No. 3185846 (pp. 5-8, FIG. 2). When the input voltage is relatively close to a voltage to be outputted in the circuit shown in FIG. 5A, a pulse synchronized with the power source as shown in FIG. 5B is used to operate the arms U and X and the arms W and Z. However, when the input voltage is reduced, the pulse pattern as shown in FIG. 5C and a voltage command pattern are used for the operation.

OBJECTS AND SUMMARY OF THE INVENTION

The method in FIGS. 5A-5C has a limitation that the input voltage cannot be increased. Furthermore, the instant voltage command used in the above example is based on an ideal, and in actuality, an IGBT or the like cannot be switched instantly. Consequently, a need has arisen to provide an interval—called a dead time—as shown in FIG. 6, between turn-off of the upper arm element and turn-on of the lower arm element. During this dead time, both the upper and the lower arm elements are turned off. The required length of this dead time depends on the device used. Thus, it is impossible to provide a pulse that is narrower (or thinner) than the dead time, as a result of which the pulse width deviates from an ideal value according to the amplitude of a voltage command due to the existence of the dead time. This limitation appears as a limit value ($\lambda$max) of an instant voltage command.

When $\lambda$max is applied to the case of FIG. 5C for example, the voltage command $\lambda$U of the phase U is distorted as shown in FIG. 7, thus causing the output voltage Vout also to be distorted, as shown in the drawing. Thus, it is an objective of the invention to improve the range in which the output voltage can be controlled and to provide a favorable output voltage having a reduced distortion.

In order to solve the problem described above, according to the invention, the serially connected arms U and X connected to the input terminal and the serially connected arms W and Z connected to the output terminal are subjected to PWM control so that both of the arms U and X and the arms W and Z can freely output a voltage in a range allowed by the apparatus. Thus, a step down operation is provided in which the arms W and Z have a voltage lower than that of the arms U and X, and a step up operation is provided in which the arms W and Z have a voltage higher than that of the arms U and X. Thus, an output voltage can be generated over the largest range possible, the effect of which is to reduce the distortion.

DETAILED DESCRIPTION OF THE PREFERRED EMBODIMENTS

Figure 1:
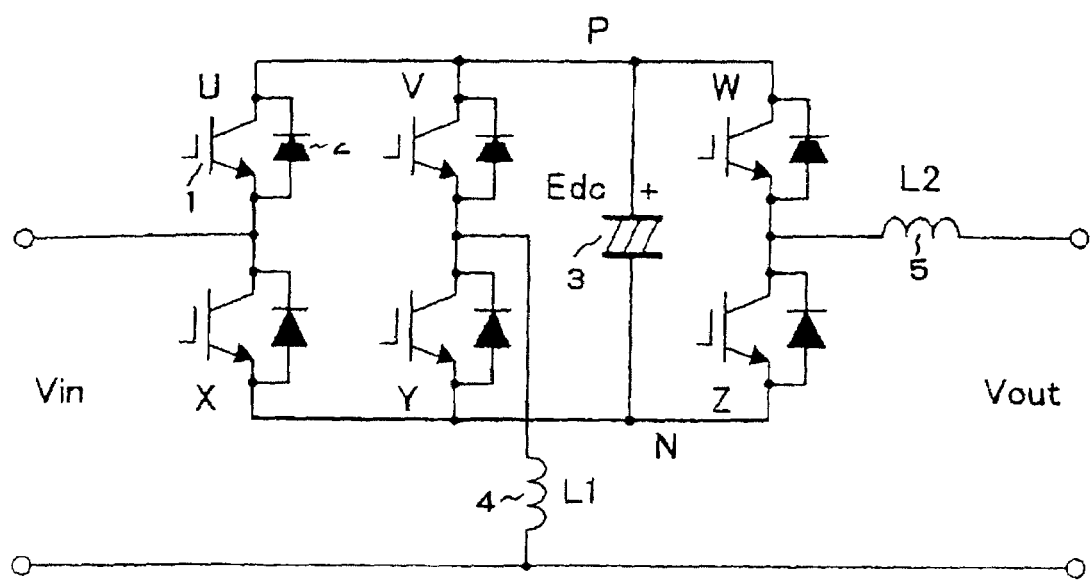
FIG. 1 is a circuit diagram illustrating the basic structure of this invention.

FIG. 1 shows an embodiment illustrating the structure of the invention. Specifically, the arm U consists of an anti-parallel circuit of the IGBT 1 and the diode 2. The arm X has the same structure. The arms U and X are in series with each other and thus form a serial circuit of the arm U and the arm X. The same applies to the serially arranged arms V and Y and the serially arranged arms W and Z. These three serial circuits are connected with the capacitor 3 in a parallel manner. The intermediate point of the arms U and X is connected to the input terminal while the intermediate point of the arms W and Z is connected via the reactor 5 to the output terminal. The intermediate point of the arms V and Y is connected via the reactor 4 to the other end of the input terminals and this terminal is connected to the other end of the output terminal.

Figure 2A:
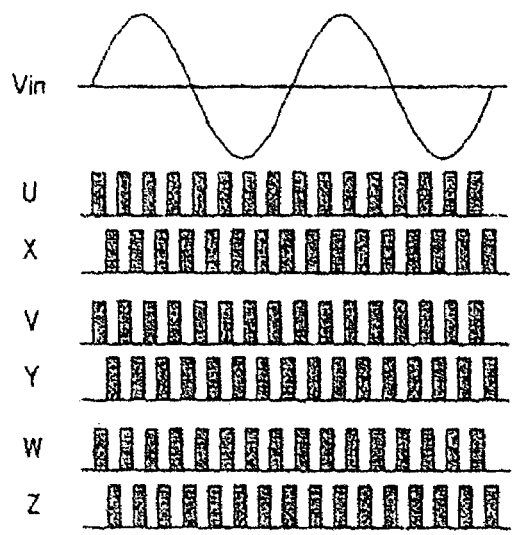
FIGS. 2A-2C illustrate the operation of the invention shown in FIG. 1.

The circuit of FIG. 1 can be assumed to be a series-parallel converter in which a parallel converter connected to an input voltage in parallel is combined with a serial converter serially connected between an input and an output. The parallel converter having a configuration of a full bridge converter, which consists of the serially connected arms U and X and the serially connected arms V and Y, is used to maintain the DC voltage of the capacitor 3 at a certain value. An example of the pulse patterns is shown in FIG. 2A, designated as U and X and V and Y.

On the other hand, in the serial converter having the configuration in which the full bridge consists of serially connected arms U and X and serially connected arms W and Z, both of the arms U and X, as well as arms W and Z are subjected to PWM modulation, so that an output voltage can be generated over the largest range possible. An example of the pulse pattern is shown in FIG. 2A as arms U and X, as well as arms W and Z.

Figure 2B:
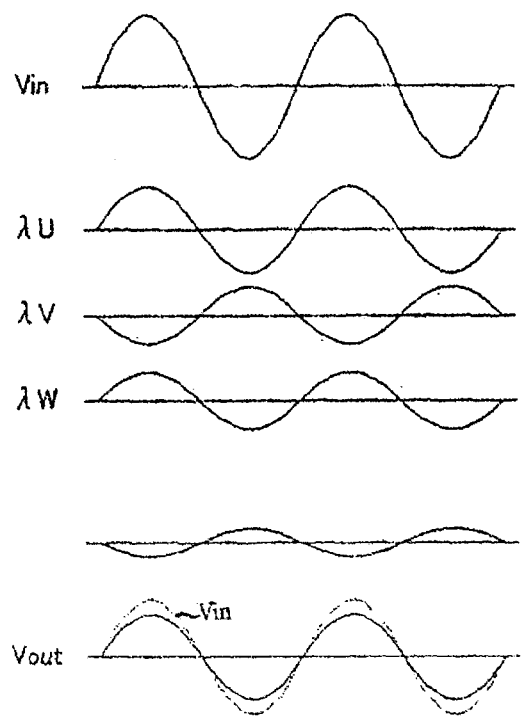

When the serially connected arms U and X have a voltage that is higher than that of the serially connected arms W and Z, the step down operation can be provided (an instant voltage command in this case is shown in FIG. 2B).

Figure 2C:
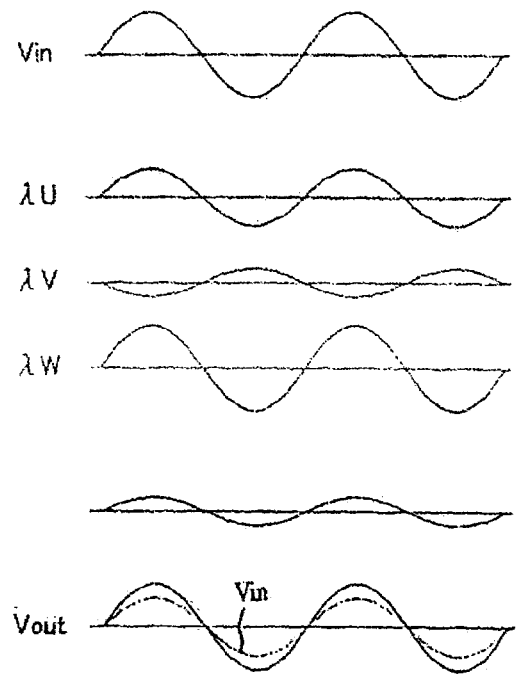
Figure 3A:
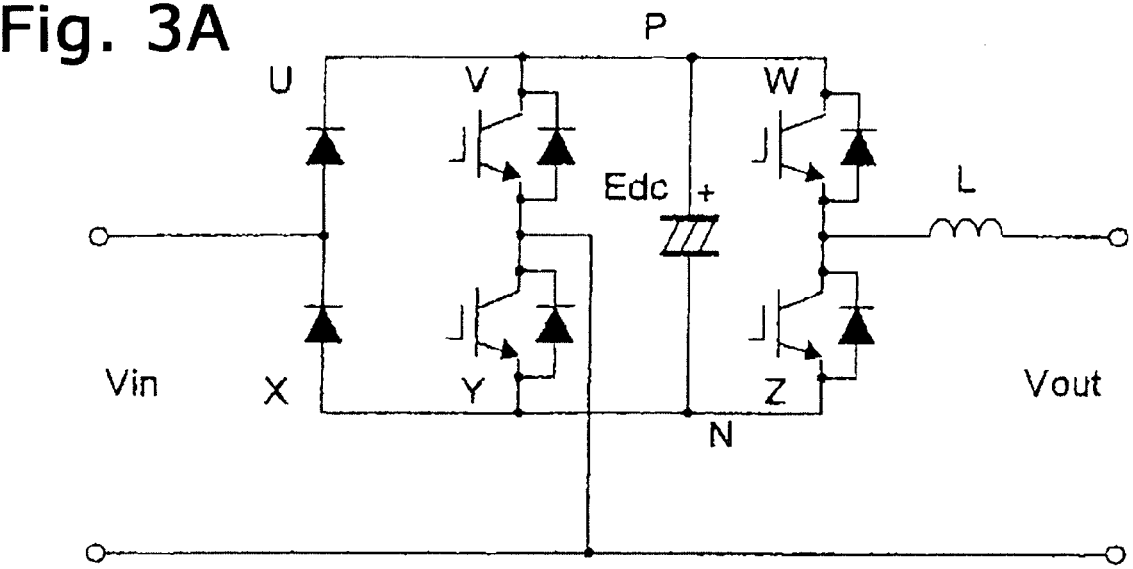
FIGS. 3A and 3B illustrate a first prior art example.
Figure 3B:
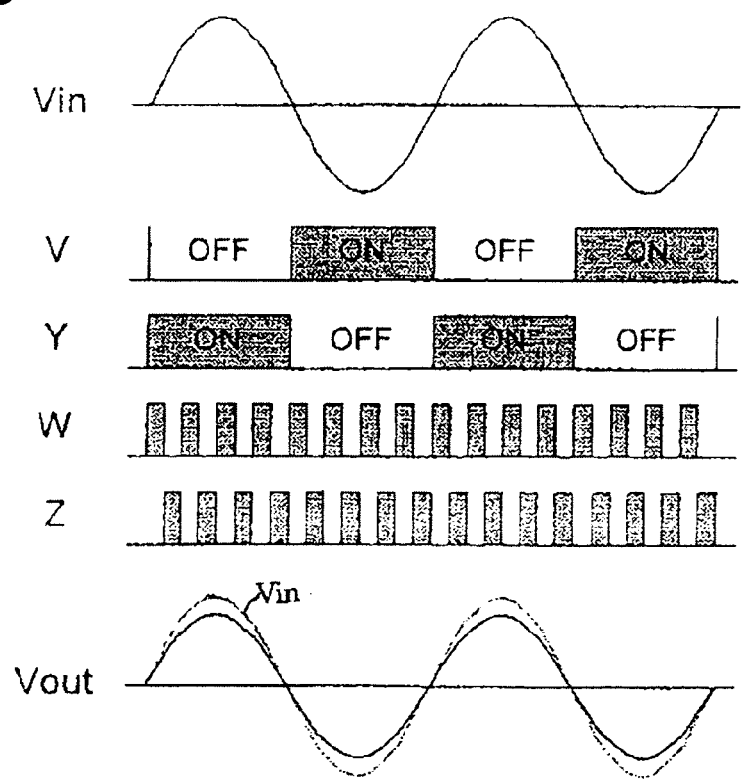
Figure 4A:
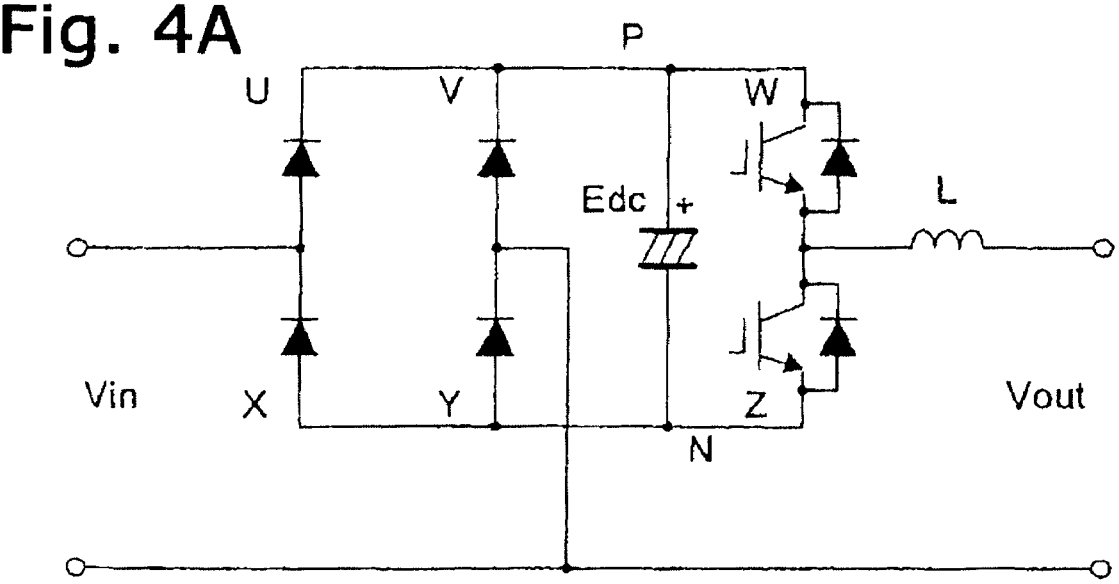
FIGS. 4A and 4B show a modification example of FIGS. 3A and 3B.
Figure 4B:
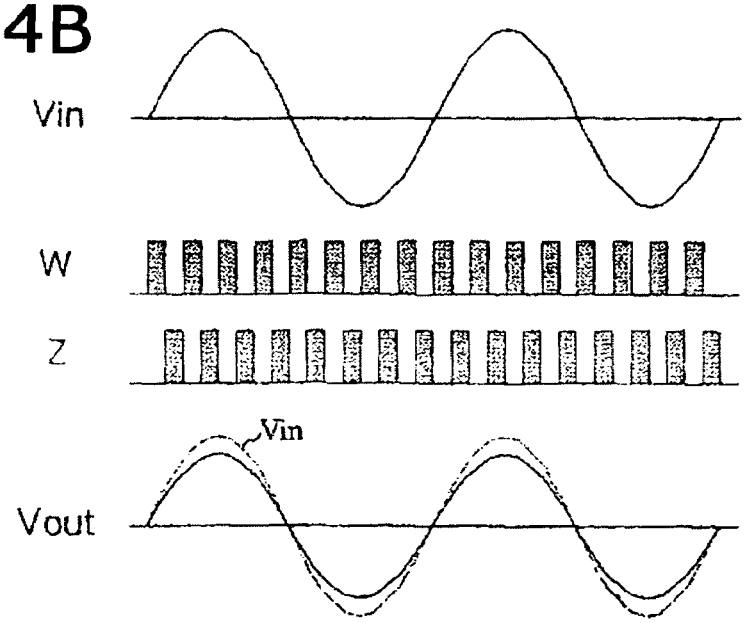
Figure 5A:
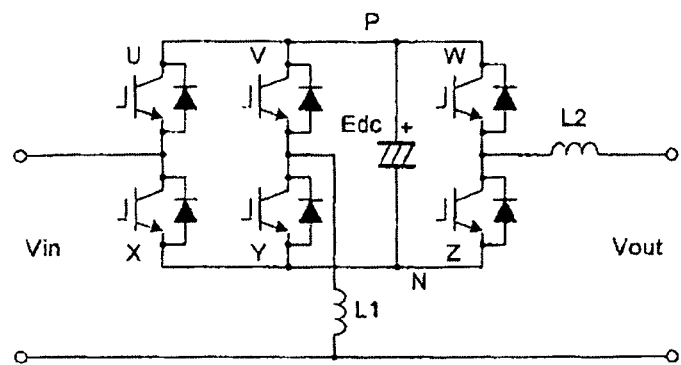
FIGS. 5A-5C illustrate a second prior art example.
Figure 5B:
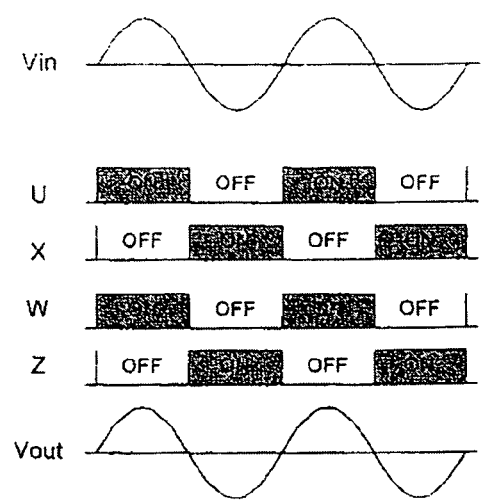
Figure 5C:
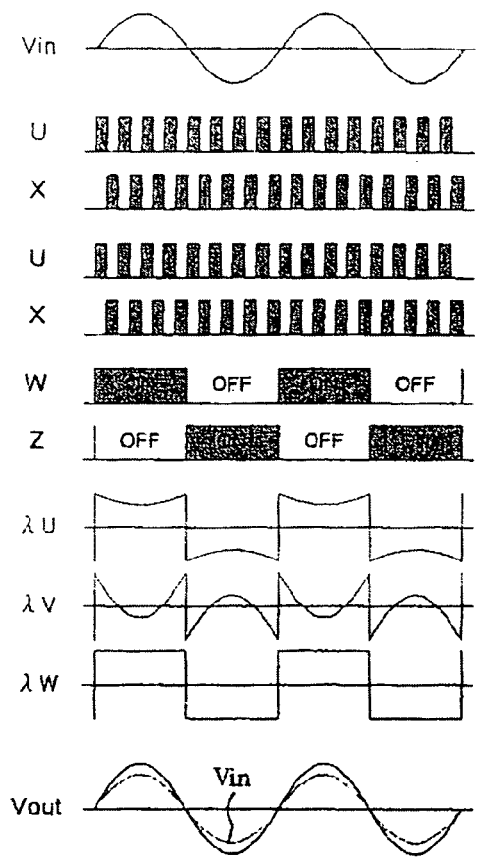
Figure 6:
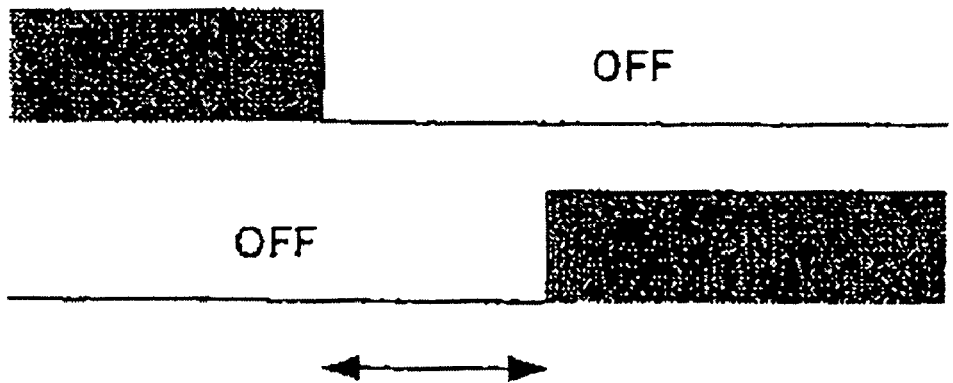
FIG. 6 illustrates the dead time.
Figure 7:
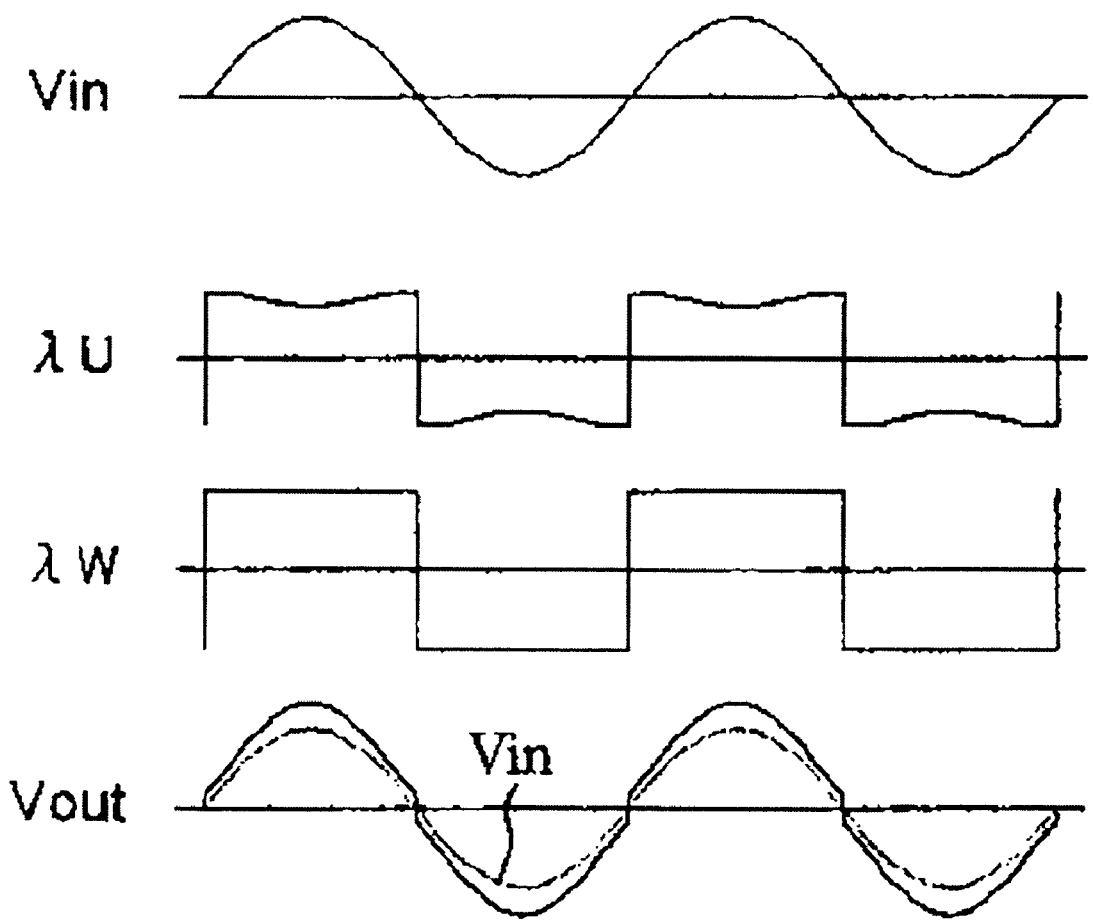
FIG. 7 illustrates the problem to be solved in prior art illustrated in FIGS. 5A-5C.

When the serially connected arms U and X have a voltage that is lower than that of the serially connected arms W and Z, the step up operation can be provided (an instant voltage command in this case is shown in FIG. 2C).

What is claimed is:

1. A power conversion apparatus, comprising a first serial circuit, a second serial circuit; a third serial circuit, and an electrical storage device, all of which are connected in parallel, wherein:

the first serial circuit includes a first switching element and a second switching element, serially connected to each other, the first switching element having a first diode, the second switching element having a second diode, the first and second diodes being connected across their respective switching elements in an anti-parallel manner;

the second serial circuit includes a third switching element and a fourth switching element, serially connected to each other, the third switching element having a third diode, the fourth switching element having a fourth diode, the third and fourth diodes being connected across their respective switching elements in an anti-parallel manner;

the third serial circuit includes a fifth switching element and a sixth switching element, serially connected to each other, the fifth switching element having a fifth diode, the sixth switching element having a sixth diode, the fifth and sixth diodes being connected across their respective switching elements in an anti-parallel manner;

an intermediate point of the first serial circuit, at which the first and second switching elements are connected, is connected to one end of an input terminal;

an intermediate point of the second serial circuit, at which the third and fourth switching elements are connected, is connected to the other end of the input terminal via a first reactor;

an intermediate point of the third serial circuit, at which the fifth and sixth switching elements are connected, is connected to one end of an output terminal via a second reactor;

the other end of the input terminal is connected to the other end of the output terminal;

a full bridge circuit consisting of the first serial circuit and the second serial circuit is used to constitute a parallel converter connected to the input terminal in parallel;

a full bridge circuit consisting of the second serial circuit and the third serial circuit is used to constitute a serial converter serially connected between the input terminal and the output terminal; and a control means is provided for controlling, in a single mode of operation, both the respective first and fifth switching elements to be turned on or off with a frequency that is higher than the frequency of an input voltage and for controlling the respective second and sixth switching elements to be turned on or off with logics that are reverse to those for the respective first and fifth switching elements, respectively.

2. The power conversion apparatus of claim 1, wherein the electrical storage device is a capacitor.

* * * * *